(12) United States Patent
Sansone (10) Patent No.: US 6,762,370 B2
(45) Date of Patent: Jul. 13, 2004

(54) VIBRATING TRAY SCALE HAVING A CLAMPING DEVICE THAT ALLOWS FOR DETECTION OF LOOSE MATTER IN A MAIL PIECE

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 162 days.

(21) Appl. No.: 10/139,161

(22) Filed: May 2, 2002

(65) Prior Publication Data

US 2003/0205414 A1 Nov. 6, 2003

(51) Int. Cl.⁷ .................. G01G 19/413; G01G 21/22
(52) U.S. Cl. .............. 177/1; 177/25.15; 177/210 FP; 705/407
(58) Field of Search .................. 177/1, 25.14, 145, 177/210 FP, 25.15; 705/407

(56) References Cited

U.S. PATENT DOCUMENTS

| | | | | |
|---|---|---|---|---|
| 4,778,018 A | * | 10/1988 | Cordery et al. | 177/210 FP |
| 4,844,188 A | * | 7/1989 | Pirc et al. | 177/145 |
| 4,856,604 A | * | 8/1989 | Sisson et al. | 177/210 FP |
| 4,865,139 A | * | 9/1989 | Cohen et al. | 177/145 |
| 4,923,023 A | * | 5/1990 | Dolan et al. | 177/25.15 |
| 5,014,797 A | * | 5/1991 | Dolan et al. | 177/25.15 |
| 5,270,938 A | | 12/1993 | Sansone et al. | 705/407 |
| 6,567,008 B1 | * | 5/2003 | Sansone | 177/145 |

* cited by examiner

Primary Examiner—Randy W. Gibson
(74) Attorney, Agent, or Firm—Brian A. Lemm; Angelo N. Chaclas (57) ABSTRACT

A vibrating tray scale capable of detecting small amounts of loose particulate matter contained within a mail piece is disclosed. The scale is provided with a clamping device having a plurality of clamping positions. Utilizing different clamping positions, the mass of a mail piece is determined two times, one not including the mass of any loose particulate matter within the mail piece and one including the mass of any loose particulate matter within the mail piece. A determination of whether or not the mail piece contains any loose particulate matter can be made based on a comparison of the results for the two mass determinations.

23 Claims, 5 Drawing Sheets

VIBRATING TRAY SCALE HAVING A CLAMPING DEVICE THAT ALLOWS FOR DETECTION OF LOOSE MATTER IN A MAIL PIECE

FIELD OF THE INVENTION

The invention disclosed herein relates generally to the processing of mail, and more particularly to a vibrating tray scale having a clamping device that allows for the detection of loose matter contained within a mail piece.

BACKGROUND OF THE INVENTION

The United States accounts for the largest domestic letter traffic in the world, handling almost 200 billion pieces of mail each year. The United States Postal Service (USPS) employs more than 850,000 employees and operates more than 44,000 post offices throughout the country. In many respects, the economy of the country is dependent upon the postal system being able to efficiently and quickly deliver mail pieces. Any type of major disruption in the delivery of mail could have potentially serious detrimental effects on the country as a whole.

Recently, attempts have been made to disrupt the postal system and use it as a weapon of terror and fear by the inclusion of harmful chemical or biological contaminants, such as, for example, the spore-forming bacterium *Bacillus anthracis* (anthrax), within or on a mail piece. Such contaminants can be carried in several forms, including for example, a powder form. The harmful effects of only a few contaminated mail pieces can be far reaching, as cross-contamination of other mail pieces can easily occur when the mail pieces come in contact with each other or are passed through the same machines during sorting. The Centers for Disease Control and Prevention estimates that tens of thousands of mail pieces could have become cross-contaminated from only two contaminated mail pieces. The use of the postal system for such purposes has resulted in the need for a reliable way to detect small amounts of loose and possibly dangerous particulate matter contained within a mail piece before they are processed by the postal authority or opened by the recipient.

Ideally, it would be desirous for the postal authority to examine and/or test each piece of mail individually for any possible contaminants before it enters the mail system, thereby isolating any contaminated mail pieces and preventing any cross-contamination. Such examination could be performed, for example, by visually inspecting each mail piece for a powdery substance contained therein. With the large volume of mail processed daily, however, the cost and time associated with visually inspecting each piece of mail makes such inspection unfeasible. It is imperative that any such testing and/or examination be capable of being performed both cost effectively and quickly to avoid delays in processing and delivering the mail.

Thus, there exists a need for a reliable way to quickly and cost effectively detect small amounts of loose and possibly dangerous particulate matter contained within a mail piece.

SUMMARY OF THE INVENTION

The present invention alleviates the problems associated with the prior art and provides a method and system that can quickly and cost effectively detect small amounts of loose particulate matter contained within a mail piece.

In accordance with the present invention, a vibrating tray scale is provided with a clamping device having a plurality of clamping positions. Utilizing different clamping positions, the mass of a mail piece is determined two times. During one mass determination, the clamping device applies pressure to the entire surface of the mail piece to secure it to the scale tray, thereby including the mass of everything contained within the mail piece, including any type of loose particulate matter. During another determination, the clamping device applies pressure to only a plurality of discrete individual pressure points on the mail piece to secure it to the scale tray, thereby allowing any loose particulate, matter contained within the mail piece to still move freely within the mail piece. Accordingly, the mass of any such loose particulate matter will not be included in the total mass of the mail piece as determined by the vibrating tray scale during this measurement.

If the mail piece contains any type of loose particulate matter, there will be a difference in the mass of the mail piece when the entire envelope is secured to the scale tray and the mass of the mail piece when only portions of the mail piece are secured to the scale tray as determined by the vibrating tray scale. The data obtained from the multiple determinations can then be used to determine if a mail piece contains any loose particulate matter. Such determination can be utilized for subsequent processing of the mail piece, i.e., if the mail piece is determined to contain loose matter, it can then be diverted from the normal processing path for further inspection, thereby preventing cross-contamination of other mail pieces and processing equipment.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
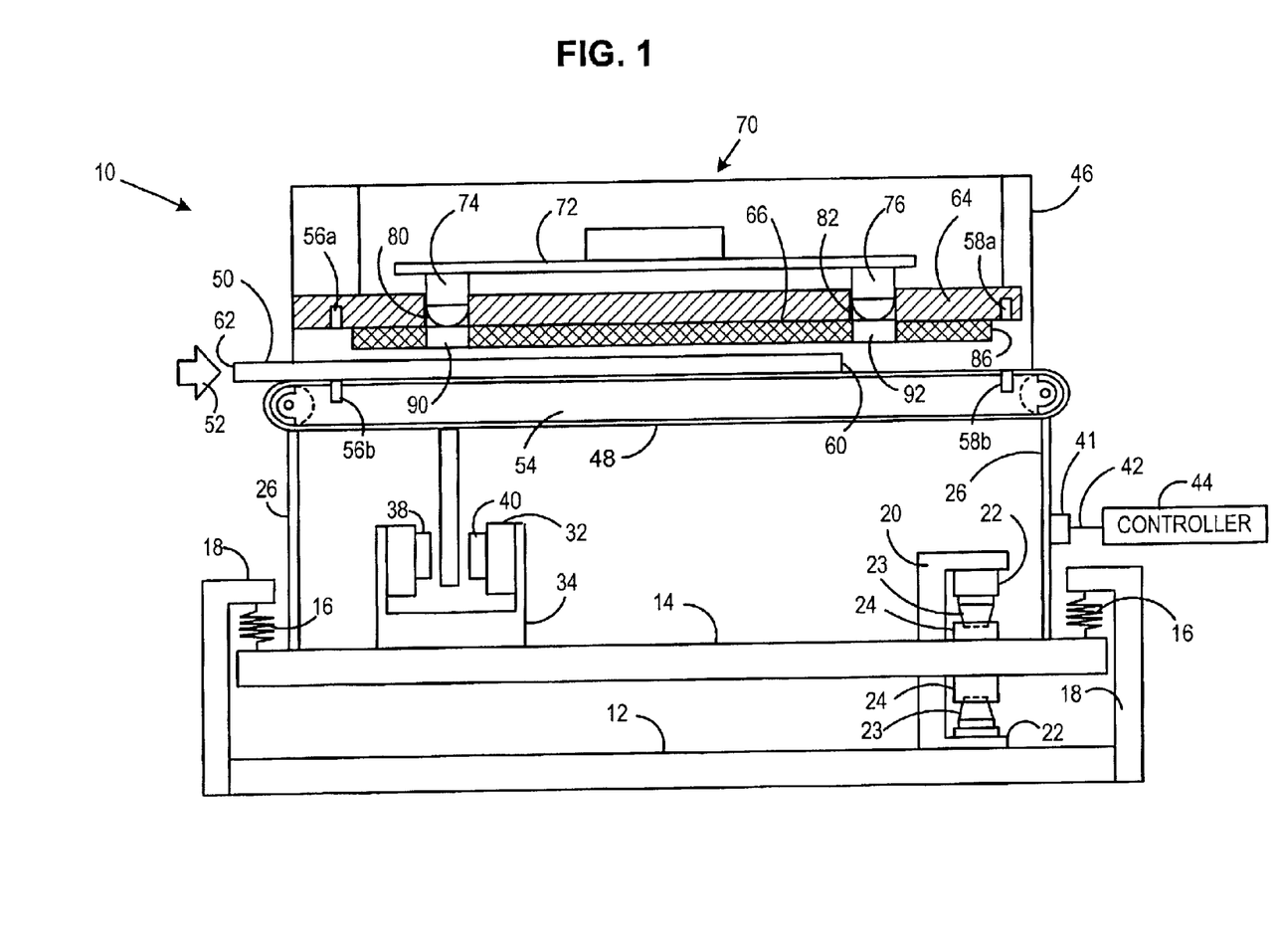
FIG. 1 illustrates a portion of a vibrating tray scale having a clamping device according to an embodiment of the present invention as a mail piece is received.
Figure 2:
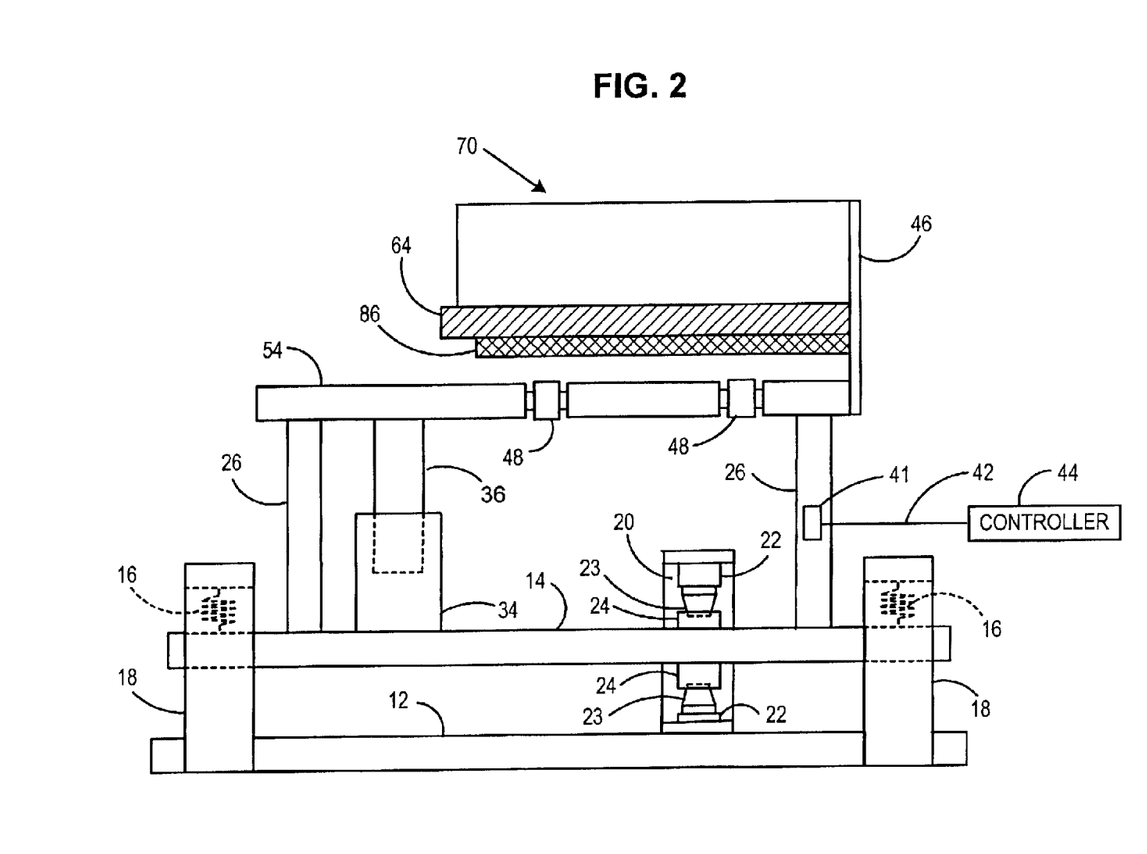
FIG. 2 illustrates an end view of the vibrating tray scale having a clamping device of FIG. 1.

In describing the present invention, reference is made to the drawings, wherein there is seen in FIGS. 1 and 2 different views of a portion of a vibrating tray scale 10 having a clamping device 70 according to an embodiment of the present invention. In general, a vibrating tray scale utilizes the principles of harmonic vibration for the purposes of determining the mass of an article. A flexibly mounted platform is caused to oscillate by an initial excitation action. The frequency of the oscillation is primarily dependent upon the total mass of the platform, and anything connected thereto, and the platform spring constant. An object is placed upon the platform and the platform is caused to oscillate by applying an exciting pulse. The period of oscillation of the platform with the article of unknown mass thereon is determined and by comparing the period with known oscillation periods (determined during calibration tests), the mass of the article can be determined using derived equations. For a complete description of the theory and operation of scales that utilize vibrating tray technology, reference is made to U.S. Pat. Nos. 4,778,018, 4,856,604, and 5,270,938, the entirety of which are hereby specifically incorporated by reference.

The scale 10 includes a frame 12 that may be placed upon a machine housing, table or other type of support. A base 14 is supported above the frame 12 by isolation coil springs 16, each of which is secured at one end to an inverted, generally L-shaped vertically extending arm 18 of the frame 12 and to the base 14 at their other ends. The isolation springs 16 serve the function of isolating the scale 10 from vibrations transmitted by the support upon which the frame 12 is placed. For example, if the scale 10 is placed upon a mail processing machine, such support member, when operating, has a tendency to transmit vibrations. The presence of the isolating springs 16 is to reduce the transmission of such vibrations.

A generally C-shaped arm 20 is attached to the frame 12. This C-shaped arm 20 supports a pair of clamping solenoids 22 whose pistons 23 have a conical shape at their ends and are engageable with depressions of generally cup shaped pads 24 that are secured to opposite sides of the base 14. Upon enablement of the solenoids 22, the pistons 23 will be received within the depressions of the pads 24 to securely hold the base 14 for reasons that will be described further below.

Secured to the base 14 are a plurality of flexible supports 26, upon which a tray or platform 54 is secured. These flexible supports 26 can be made of thin strips of stainless steel or aluminum. Although two flexible supports 26 are illustrated in FIG. 1, it should be understood that any number may be used without departing from the scope of the invention. Secured to the tray 54 is a bracket 46 to which clamping device 70 is secured.

An electromagnet 32 is supported by a bracket 34 that is mounted on the base 14. An armature 36 extends from the tray 54 and is received between with the poles 38, 40 of the electromagnet 32. A transducer 41, such as, for example, a piezoelectric device, is secured to one of the flexible supports 26 and has a lead 42 extending therefrom to provide data from the scale 10 to controller 44. Controller 44 may be, for example, a microprocessor, that utilizes the data from scale 10 to determine the mass of a mail piece as will be further described below.

Referring now to FIGS. 1 and 3–5, the processing of a mail piece, such as, for example, an envelope 50, by scale 10 is illustrated. An envelope 50 is fed into the scale 10 in the direction as indicated by arrow 52. The envelope 50 is input to scale 10 between lower tray 54 and upper tray 64 utilizing a transport device such as, for example, one or more transport belts 48. Entry of the envelope 50 into the scale 10 is detected by the leading edge 60 of envelope 50 passing between a pair of corresponding sensors 56a, 56b located in trays 64, 54 respectively. Once the envelope has completely entered the scale 10, sensors 56a, 56b will detect the trailing edge 62 of the envelope 50 and the envelope 50 will come to a stop between the trays 54, 64.

Figure 3:
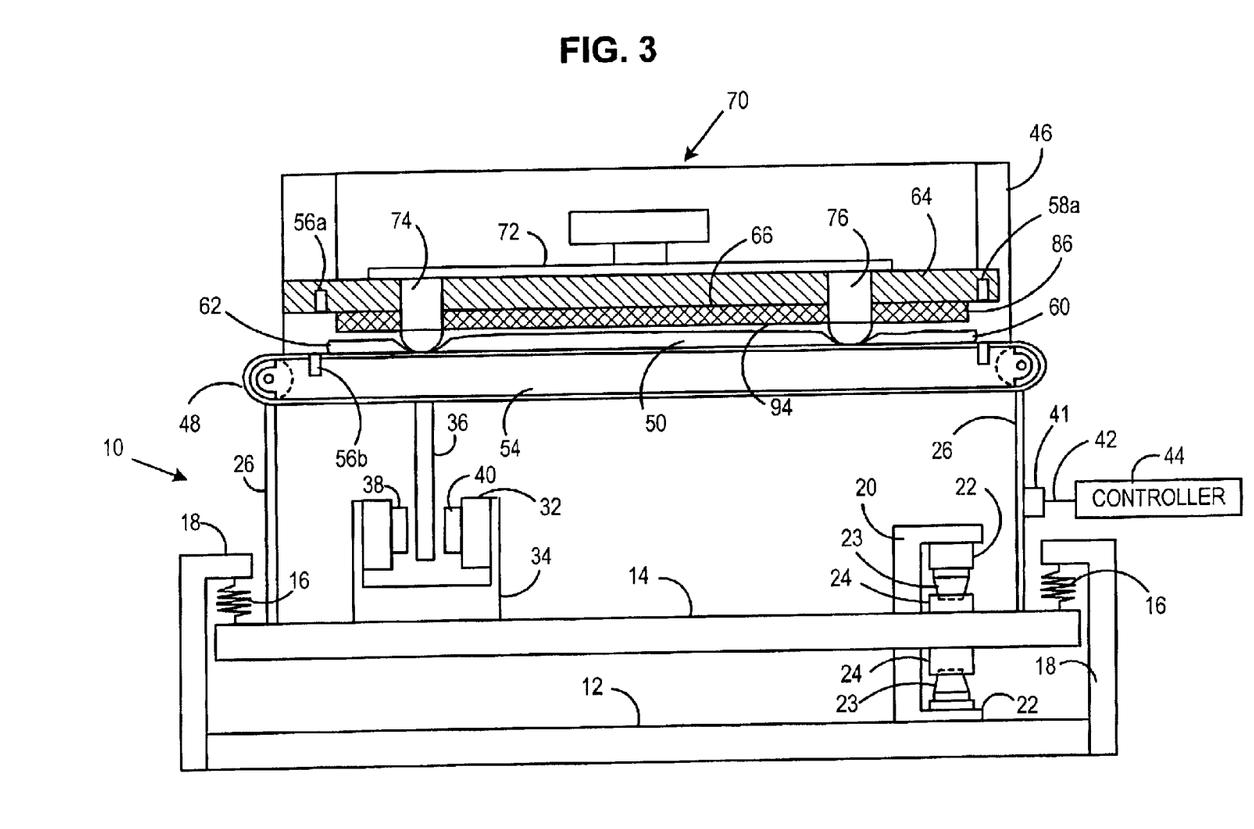
FIG. 3 illustrates determination of the mass of a mail piece, including any loose particulate matter, utilizing the vibrating tray scale and clamping device according to an embodiment of the present invention.

As noted above, a clamping device 70 is provided to securely hold the envelope 50 during determination of the mass of envelope 50. Clamping device 70 includes a movable support member 72 upon which a plurality of pins are mounted, such as, for example, pins 74, 76. It should be understood that while two pins 74, 76 are illustrated, the invention is not so limited and any number of pins can be utilized. Pins 74, 76 are positioned such that they are aligned with openings 80, 82, respectively, in tray 64. When support member 72 is in a raised position, the tips of pins 74, 76 preferably do not extend below the lower surface 66 of tray 64. A cushioning member 86 is secured to the lower surface 66 of tray 64. Cushioning member 86 is preferably formed of a soft polymeric material such that it compresses slightly when upper tray 64 is brought into contact with lower tray 54. Cushioning member 86 includes openings 90, 92 that are aligned with openings 80, 82 in upper tray 64.

Referring now to FIG. 3, there is illustrated the scale 10 during a first mass determination of the envelope 50. During the first determination, certain contents of the envelope 50, as described below, can move freely within the envelope 50. When the envelope 50 has been positioned between the trays 54, 64, support member 72 is moved into its lowered position, thereby causing pins 74, 76 to project below the lower surface of tray 64 and the lower surface 94 of cushion 86. Clamping device 70 is then moved towards tray 54 such that the envelope 50 is firmly secured between the tips of pins 74, 76 and the top surface of tray 54. Preferably, a small gap exists between the lower surface of cushion 86 and the envelope 50. Accordingly, the envelope 50 is secured in a discrete number of locations, which while securely holding any large material, such as inserts or letters, within envelope 50, allows any small materials, such as, for example, a loose particulate matter, to still move within the envelope 50. After the envelope 50 is secured by the pins 74, 76 of clamping device 70, solenoids 22 are activated such that the pistons 23 become disengaged from the pads 24. At this time, both the tray 54 and the base 14 are in a state of free movement, the tray 54 being in such state because of the flexible supports 26 and the base because of the presence of the springs 16. Consequently, the base 14 and everything attached thereto is isolated from its surroundings. At this time, the electromagnet 32 is actuated by charges being sent alternatively to the poles 38, 40. This double pulse will cause attraction of the armature 36 towards one of the poles 38, 40 and then towards the other. The pulse will initiate free oscillation of the tray 54 because of the flexibility of the flexible supports 26. As the tray 54 oscillates, a sinusoidal signal is transmitted from the transducer 41 to the controller 44 which will determine the frequency of the oscillations. This determined frequency will then be used to compute the mass of the envelope 50 located upon the tray 54. The use of vibrating tray technology to determine the mass of the envelope 50 will effectively eliminate the effect of any type of loose material, such as particulate matter, that is contained within the envelope 50 upon the determination of the mass of the envelope 50, since the loose material is essentially "floating" during the oscillation of the envelope 50.

The determination of the mass of the envelope 50 located upon the tray 54 is performed by controller 44 in accordance with the following formula:

$$M_E = C_1(T^2 - T_0^2) + C_2(T^2 - T_0^2)^2 \tag{1}$$

where $M_E$ is the mass of envelope 50, $T_0$ is the period of oscillation with no mail piece upon tray 54 and T is the period with the mail piece, i.e., envelope 50, present upon the tray 54. $T_0$, $C_1$ and $C_2$ are constants which depend on the mass M of the base 14 and the mass of the tray 54, including clamping device 70, as well as on the spring constants of the isolation springs 16 and the flexible supports 26. These constants are determined empirically in a calibration procedure in which the periods are determined for at least two different masses as well as for the empty tray 54. In the case where the base 14 is substantially heavier than the mass of the tray 54 plus the mass of the mail piece, the constant $C_1$ is given by the formula:

$$C_1 \approx K/(4\pi^2) \qquad (2)$$

where K is the spring constant of the flexible supports 26. In the same case $T_O$ is given by the formula:

$$T_0^2 \approx (4\pi^2) M_p/K \qquad (3)$$

where $M_p$ is the mass of tray 54, including clamping device 70.

When a spring is attached to two isolated masses m and M, its period of oscillation is:

$$T^2 = 4\pi^2 \mu/K \qquad (4)$$

where $\mu$ is the reduced mass:

$$\mu = mM/(m+M) \qquad (5)$$

In the case where M is much larger than m, the reduced mass p is less than and close to the value of m. Equation (4) can be solved for m in terms of T. In the scale 10, the base 14 mass M is much larger than m, i.e., the combined tray 54, including clamping device 70, plus envelope 50; however, due to the accuracy required, the difference between p and m must be taken into account. This is done by combining equations 4 and 5.

Figure 4:
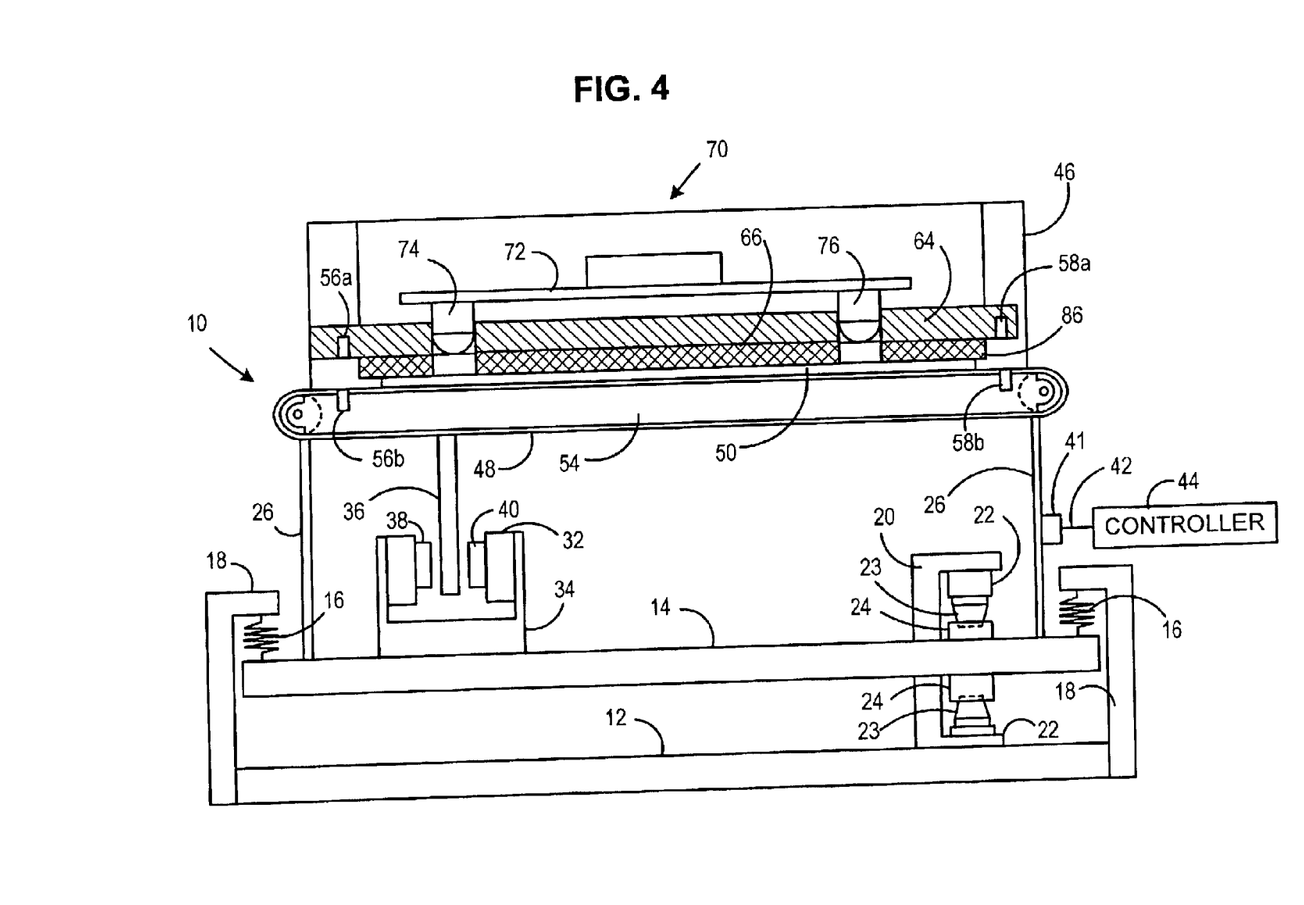
FIG. 4 illustrates determination of the mass of a mail piece, not including any loose particulate matter, utilizing the vibrating tray scale and clamping device according to an embodiment of the present invention.

Referring now to FIG. 4, once the determination of the mass of envelope 50 has been determined with the envelope 50 secured to the tray 54 in only a small number of locations, a second determination is performed. Specifically, support member 72 is moved into its upper position, thereby causing pins 74, 76 to raise such that the tips of pins 74, 76 do not extend below the lower surface 66 of tray 64. Clamping device 70 is then moved closer to tray 54 such that the cushion 86 makes contact with the envelope 50 and the envelope 50 is secured between the cushion 86 and lower tray 54. During this operation, solenoids 22 may be enabled to securely hold the base 14 until envelope 50 is secured between the cushion 86 and lower tray 54. Preferably, the entire surface area or substantially all of the surface area of the face of envelope 50 is secured between the cushion 86 and lower tray 54. Since the cushion 86 contacts the envelope 50 over a substantial portion, if not all, of the face of envelope 50, all of the contents of the envelope 50, including any loose particulate matter contained therein, will contribute to the determination of the mass of the envelope 50. The entire platform, including trays 54, 64 and clamping device 70, is then oscillated again and the mass of the envelope 50 is determined, including the mass of any particulate matter contained within envelope 50, similarly as described above.

Figure 5:
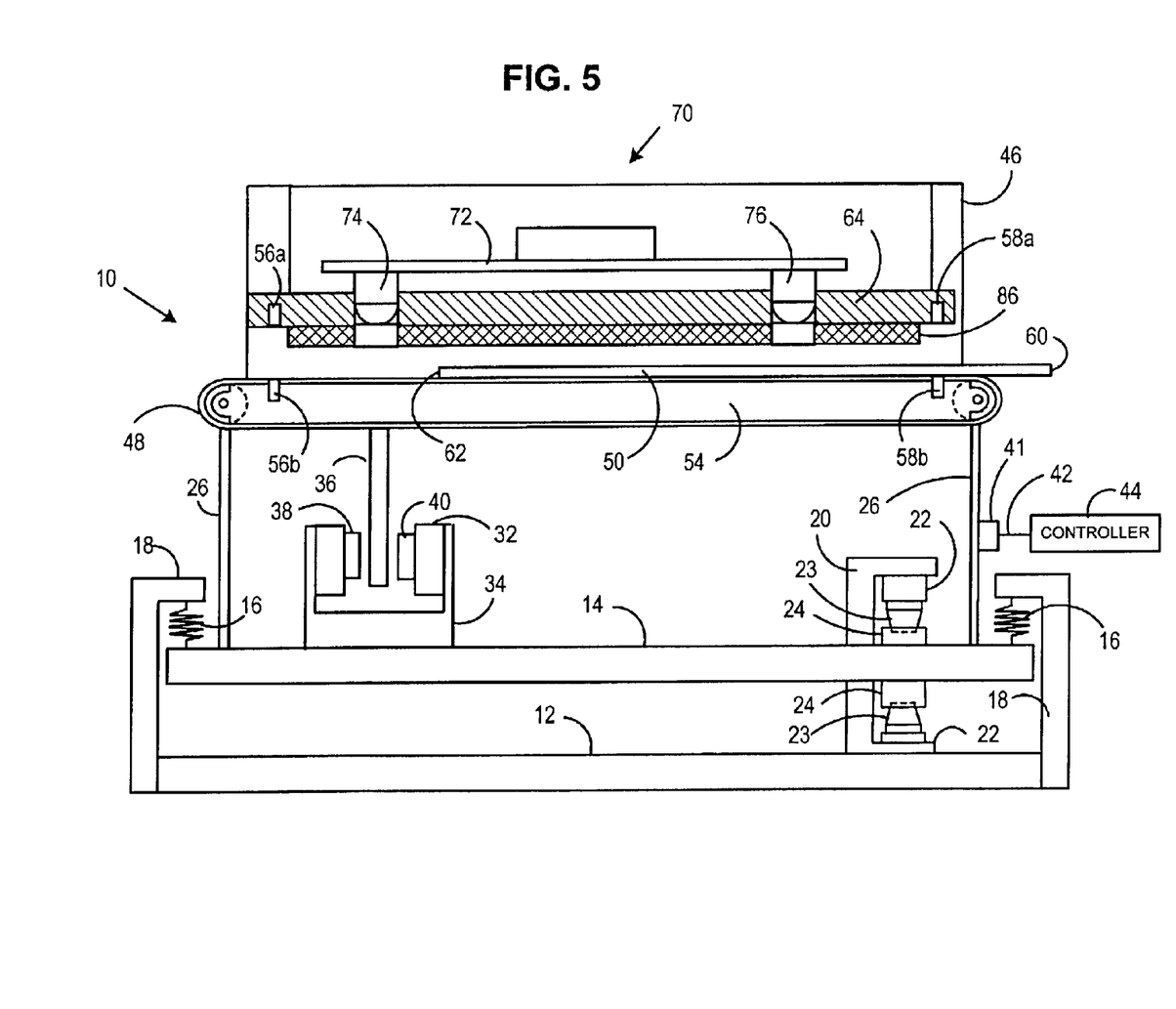
FIG. 5 illustrates a mail piece exiting the vibrating tray scale and clamping device according to the present invention.

Referring now to FIG. 5, once both determinations of the mass of the envelope 50 have been performed, the solenoids 22 are enabled to securely hold the base 14. Clamping device 70 will move away from the lower tray 54, thereby releasing the envelope 50 from between the cushion 86 and tray 54, and allowing the envelope 50 to exit from the scale 10 via transport belt 48. The envelope 50 has completely exited the scale 10 when the corresponding pair of detectors 58a, 58b detect the trailing edge 62 of envelope 50. Scale 10 is then ready to accept another envelope for processing.

Thus, controller 44 will determine the mass of envelope 50 two times. In the first determination, the mass ($M_{E1}$) of the envelope 50 is determined as previously described with respect to FIG. 3, i.e., with the envelope 50 secured to the tray 54 of scale 10 in a discrete number of locations, thereby allowing any small materials, such as, for example, a loose particulate matter, to still move within the envelope 50. In the second determination, the mass ($M_{E2}$) is determined as previously described with respect to FIG. 4, i.e., with all or substantially all of the of the surface area of the face of envelope 50 secured to the tray 54 of scale 10, thereby including any loose particulate matter contained therein in the determination of the mass of the envelope 50. It should be understood, of course, that the order of the mass determination could be reversed, if desired. If the envelope 50 does not contain any type of loose matter, such as, for example, particulate matter in the form of powder, then the values for $M_{E1}$ and $M_{E2}$ will be nearly identical, if not identical. If the envelope 50 contains any loose particulate matter, then the value for $M_{E2}$ will be greater than the value for $M_{E1}$ for the reasons previously described with respect to FIGS. 3 and 4.

By comparing the values for $M_{E1}$ and $M_{E2}$, controller 44 can determine if a loose particulate matter is contained within envelope 50. Optionally, controller 44 could determine the difference between the values for $M_{E1}$ and $M_{E2}$ and compare the determined difference to a predetermined threshold value to determine if a loose particulate matter is present in envelope 50. Since scale 10 is capable of making measurements with a resolution of 0.001 ounces and accuracy of at least 0.01 ounces, the threshold value can be set very low, thereby allowing for the detection of even very small amounts of particulate matter. If the difference between the values for $M_{E1}$ and $M_{E2}$ is not greater than the threshold value, controller 44 will determine that there is no loose particulate matter contained within envelope 50. If the difference between the values for $M_{E1}$ and $M_{E2}$ is greater than the threshold value, controller 44 will determine that there is loose particulate matter contained within envelope 50. Based on the determination made by controller 44, subsequent processing of the envelope 50 can be determined, i.e., if the envelope 50 is determined to contain loose matter, it can then be diverted from the normal processing path for further inspection, thereby preventing cross-contamination of other mail pieces and processing equipment.

It should be noted that while scale 10 determines mass as opposed to weight, the scale 10 may also be referred to as a weighing device, since determination of the weight of an article can easily be determined from the mass. Accordingly, the scale 10 could also be utilized to determine the weight of the envelope 50, based on the determined mass. A determination as to whether loose particulate matter is contained therein can then be made by comparing the two values for the weight of the envelope 50.

Thus, according to the present invention, the mass of each mail piece is determined two times utilizing a vibrating tray scale. During one determination, pressure is applied to the entire surface or substantially all of the surface of the mail piece to secure it to the scale tray, thereby determining the mass of everything contained within the mail piece, including any type of loose particulate matter. During another determination, pressure is applied to only a plurality of individual pressure points on the mail piece to secure it to the scale tray, thereby allowing any loose particulate matter contained within the mail piece to still move freely within the mail piece. Accordingly, the mass of any such loose particulate matter will not be included in the determination by the vibrating tray scale during this measurement. If the mail piece contains any type of loose particulate matter, there will be a difference in the determined masses of the mail piece as determined by the vibrating tray scale. The mail piece can then be diverted from the normal processing path for further inspection, thereby preventing cross-contamination of other mail pieces and processing equipment.

It should be understood that although the present invention was described with respect to mail processing by a post office, the present invention is not so limited and can be utilized in any application in which mail is received. For example, the detection system could also be utilized by a business or company upon receipt of the mail. By utilizing the present invention at mail acceptance, prior to sorting the mail in the mailroom for internal delivery, any mail pieces suspected of containing a contaminant can be isolated and removed from the processing system, thereby protecting the intended recipient or other office personnel from possible exposure to the contaminant, along with preventing contamination of the company's sorting machines, as well as cross-contamination of any other mail pieces.

While a preferred embodiment of the invention has been described and illustrated above, it should be understood that this is exemplary of the invention and is not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A scale comprising:
   a platform to receive a mail piece; and
   a clamping device to hold the mail piece to the platform, the clamping device having a plurality of clamping positions, a first of the plurality of clamping positions holding the mail piece to the platform over at least a substantial portion of the mail piece, a second of the plurality of clamping positions holding the mail piece to the platform in a discrete number of locations.

2. The scale according to claim 1, further comprising:
   an oscillating device to initiate oscillation of the platform during the first and second clamping positions,
   wherein a first mass of the mail piece is determined based on the oscillation of the platform during the first clamping position, and a second mass of the mail piece is determined based on the oscillation of the platform during the second clamping position.

3. The scale according to claim 1, wherein the clamping device further comprises:
   a tray having a surface opposed to the platform, the tray being movable toward the platform to hold at least a substantial portion of the mail piece between the tray and the platform during the first of the plurality of clamping positions.

4. The scale according to claim 3, further comprising:
   a cushioning member secured to at least a portion of the surface of the tray.

5. The scale according to claim 4, wherein the clamping device further comprises:
   a pin having a tip, the pin being movable such that at least the tip of the pin extends beyond the cushioning member to hold the mail piece to the platform during the second of the plurality of clamping positions.

6. The scale according to claim 4, wherein the clamping device further comprises:
   a plurality of pins each having a respective tip, the plurality of pins being movable such that at least the respective tip of each of the plurality pins extends beyond the cushioning member to hold the mail piece to the platform during the second of the plurality of clamping positions.

7. The scale according to claim 3, wherein the clamping device further comprises:
   a pin having a tip, the pin being movable such that at least the tip of the pin extends beyond the surface of the tray to hold the mail piece to the platform during the second of the plurality of clamping positions.

8. The scale according to claim 3, wherein the clamping device further comprises:
   a plurality of pins each having a respective tip, the plurality of pins being movable such that at least the respective tip of each of the plurality pins extends beyond the surface of the tray to hold the mail piece to the platform during the second of the plurality of clamping positions.

9. A device to measure the mass of a mail piece comprising:
   a base;
   a platform to support the mail piece;
   at least one flexible member connecting the platform to the base;
   an oscillating device to initiate oscillation of the platform;
   a transducer coupled to the at least one flexible member to provide a signal based on the oscillation of the platform;
   a controller coupled to the transducer to receive the signal based on the oscillation of the platform; and
   a clamping device to hold the mail piece to the platform, the clamping device having a plurality of clamping positions, a first of the plurality of clamping positions holding the mail piece to the platform over at least a substantial portion of the mail piece, a second of the plurality of clamping positions holding the mail piece to the platform in a discrete number of locations,
   wherein a first mass of the mail piece is determined by the controller based on the signal from the transducer during the first clamping position, the first mass including substantially all contents of the mail piece, and a second mass of the mail piece is determined by the controller based on the signal from the transducer during the second clamping position, the second mass not including any loose particulate matter contained in the mail piece.

10. The device according to claim 9, wherein the clamping device further comprises:
    a tray having a surface opposed to the platform, the tray being movable toward the platform to hold at least a substantial portion of the mail piece between the tray and the platform during the first of the plurality of clamping positions.

11. The device according to claim 10, further comprising:
    a cushioning member secured to at least a portion of the surface of the tray.

12. The device according to claim 11, wherein the clamping device further comprises:
    a pin having a tip, the pin being movable such that at least the tip of the pin extends beyond the cushioning member to hold the mail piece to the platform during the second of the plurality of clamping positions.

13. The device according to claim 11, wherein the clamping device further comprises:

a plurality of pins each having a respective tip, the plurality of pins being movable such that at least the respective tip of each of the plurality pins extends beyond the cushioning member to hold the mail piece to the platform during the second of the plurality of clamping positions.

14. The device according to claim 10, wherein the clamping device further comprises:

a pin having a tip, the pin being movable such that at least the tip of the pin extends beyond the surface of the tray to hold the mail piece to the platform during the second of the plurality of clamping positions.

15. The device according to claim 10, wherein the clamping device further comprises:

a plurality of pins each having a respective tip, the plurality of pins being movable such that at least the respective tip of each of the plurality pins extends beyond the surface of the tray to hold the mail piece to the platform during the second of the plurality of clamping positions.

16. The device according to claim 9, wherein the controller compares the first determined mass and the second determined mass to determine if the mail piece contains a loose particulate matter.

17. A method for processing a mail piece comprising the steps of:

providing the mail piece to a platform of a scale;

holding the mail piece to the platform of the scale in a discrete number of locations;

determining a first mass of the mail piece with the mail piece held to the platform in the discrete number locations;

holding the mail piece to the platform of the scale over substantially all of the mail piece; and determining a second mass of the mail piece with substantially all of the mail piece held to the platform.

18. The method according to claim 17, further comprising:

comparing the first determined mass and the second determined mass to determine if there is a difference.

19. The method according to claim 17, wherein the step of holding the mail piece to the platform of the scale in a discrete number of locations further comprises:

holding the mail piece to the platform with at least one pin.

20. The method according to claim 19, wherein the step of holding the mail piece to the platform with at least one pin further comprises:

moving the least one pin toward the platform such that a tip of the at least one pin holds the mail piece to the platform.

21. The method according to claim 17, wherein the step of holding the mail piece to the platform of the scale over substantially all of the mail piece further comprises:

holding the mail piece between a tray that opposes the platform and the platform.

22. The method according to claim 21, wherein the step of holding the mail piece between a tray that opposes the platform and the platform, moving a surface of the tray opposing the platform towards the platform such that substantially all of the mail piece is held between the surface of the tray and the platform.

23. The method according to claim 22, wherein the surface of the tray is provided with a cushioning member.

* * * * *